United States Patent
Kadotani (10) Patent No.: US 6,950,166 B2
(45) Date of Patent: Sep. 27, 2005

(54) LIQUID CRYSTAL DISPLAY DEVICE HAVING A HIGHER CONTRAST RATIO

(75) Inventor: Tsutomu Kadotani, Kanagawa (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 104 days.

(21) Appl. No.: 10/629,526

(22) Filed: Jul. 29, 2003

(65) Prior Publication Data

US 2004/0057004 A1 Mar. 25, 2004

(30) Foreign Application Priority Data

Jul. 31, 2002 (JP) ........................................ 2002-223113

(51) Int. Cl.[7] ........................ G02F 1/343; G02F 1/1333
(52) U.S. Cl. ..................................... 349/141; 349/110
(58) Field of Search ................................ 349/110, 139, 349/141, 113

(56) References Cited

U.S. PATENT DOCUMENTS 6,587,162 B1 * 7/2003 Kaneko et al. ............... 349/43
2003/0184699 A1 * 10/2003 Matsumoto et al. ........ 349/141

FOREIGN PATENT DOCUMENTS

JP          11-337922        12/1999

* cited by examiner

Primary Examiner—Toan Ton
(74) Attorney, Agent, or Firm—Katten Muchin Rosenman LLP (57) ABSTRACT

A LCD device has a black matrix defining a plurality of pixel areas in the LCD device. An interconnect layer formed on a TFT panel includes a first interconnect line passing through the pixel area and a second interconnect line passing outside the pixel area. The first interconnect line is lower in a product of a thickness thereof by a surface reflectance thereof than the second interconnect line.

12 Claims, 6 Drawing Sheets

LIQUID CRYSTAL DISPLAY DEVICE HAVING A HIGHER CONTRAST RATIO

BACKGROUND OF THE INVENTION (a) Field of the Invention

The present invention relates to liquid crystal display (LCD) device having a higher contrast ratio and, more particularly, to a LCD device including an interconnect line having a lower surface reflectance.

(b) Description of the Related Art

LCD devices are used in a variety of fields such as household use or medical use, and the number of fields in which the LCD devices are used are increasing. In general, the LCD device includes a pair of polarization plates disposed at the backlight side and the front side of a LCD panel and sandwiching therebetween the LCD panel. The polarization plates have respective polarization axes perpendicular to each other. By applying an electric field to the liquid crystal (LC) layer in the LCD device, the light components passing through the LC layer and polarization plate disposed at the front side are controlled for display of a desired image.

In the LCD device, the term "contrast ratio" is defined by a ratio of a brightness (black brightness) of the screen portion at which black is displayed to a brightness (white brightness) of the screen portion at which white is displayed. The contrast ratio is one of the indicators for evaluating the performances of the LCD device. In general, a higher white brightness and a lower black brightness achieve a higher contrast ratio, which provides an excellent display performance for the LCD device due to a clear distinction between the black and the white. For example, a specific LCD device for use in a medical instrument is desired to have a contrast ratio as high as 600 or above. In an in-plane switching mode (IPS) LCD device, which displays black upon application of no voltage thereto, a higher uniformity in the orientation of the liquid crystal molecules achieves a lower black brightness, thereby improving the contrast ratio.

It is noted that some of the light components incident onto the LCD device from the backlight source are scattered upside direction by the side of interconnect lines and electrodes, which may be sometimes referred to as collectively interconnect lines, thereby causing the change of polarized-state. The obliquely incident light have higher probability to be scattered when the interconnect lines, on which side the obliquely incident light is scattered, have larger thickness. Some of such scattered light are incident onto the polarization plate on the front side perpendicularly thereto. Thus, the polarization plate may pass the undesirable light components (scattered light) at black-state, to thereby lower the contrast ratio due to a resultant higher black brightness.

Patent Publication JP-A-11(1999)-337922 describes a technique for improving the contrast ratio of the LCD device, wherein the incident angles of the light components incident onto the LCD panel from the backlight source are limited within a specified angle. More specifically, the light components each having a specified angle or below with respect to the perpendicular line of the LCD panel are passed among all the light components incident onto the LCD panel from the backlight source, whereas the light components each having an angle higher than the specified angle are blocked. By reducing the light components passing obliquely within the LCD panel, the intensity of scattered light is reduced in the LCD panel to raise the contrast ratio.

If aluminum interconnect lines having a higher surface reflectance are provided in the pixel area through which light passes, especially in the IPS LCD device, it is likely to cause scattering of light. Accordingly, the restriction of the amount of light components obliquely passing in the LCD panel, as described in the publication, does not effectively prevent the light from being scattered by the side surfaces of the interconnect lines. Thus, a higher black brightness is caused to degrade the contrast ratio, whereby the improvement in the contrast ratio is not sufficient in the LCD devices.

SUMMARY OF THE INVENTION

In view of the above problem in the conventional LCD device, it is an object of the present invention to provide a LCD device capable of suppressing the scattering of light within the LCD panel and thus achieving a higher contrast ratio.

The present invention provides a LCD device including: a liquid crystal layer; a pair of opposing panels sandwiching therebetween the liquid crystal layer; a black matrix mounted on either of the opposing panels for defining an array of pixels each having a pixel area in the LCD device; and an interconnect layer mounted on one of the opposing panels and patterned to a plurality of interconnect lines formed on a common insulator, wherein one of the interconnect lines extending in the pixel area is lower in a product of a thickness thereof by a surface reflectance thereof than another of the interconnect lines extending outside the pixel area.

In accordance with the LCD device of the present invention, the intensity of scattered light caused by the one of the interconnect lines extending in the pixel area can be reduced due to the lower surface reflectance of the one of the interconnect lines, whereas the another of the interconnect lines extending outside the pixel area has a lower line resistance to achieve a desired operational speed.

PREFERRED EMBODIMENTS OF THE INVENTION

Now, the present invention is more specifically described with reference to accompanying drawings, wherein similar constituent elements are designated by similar reference numerals throughout the drawings.

Figure 1:
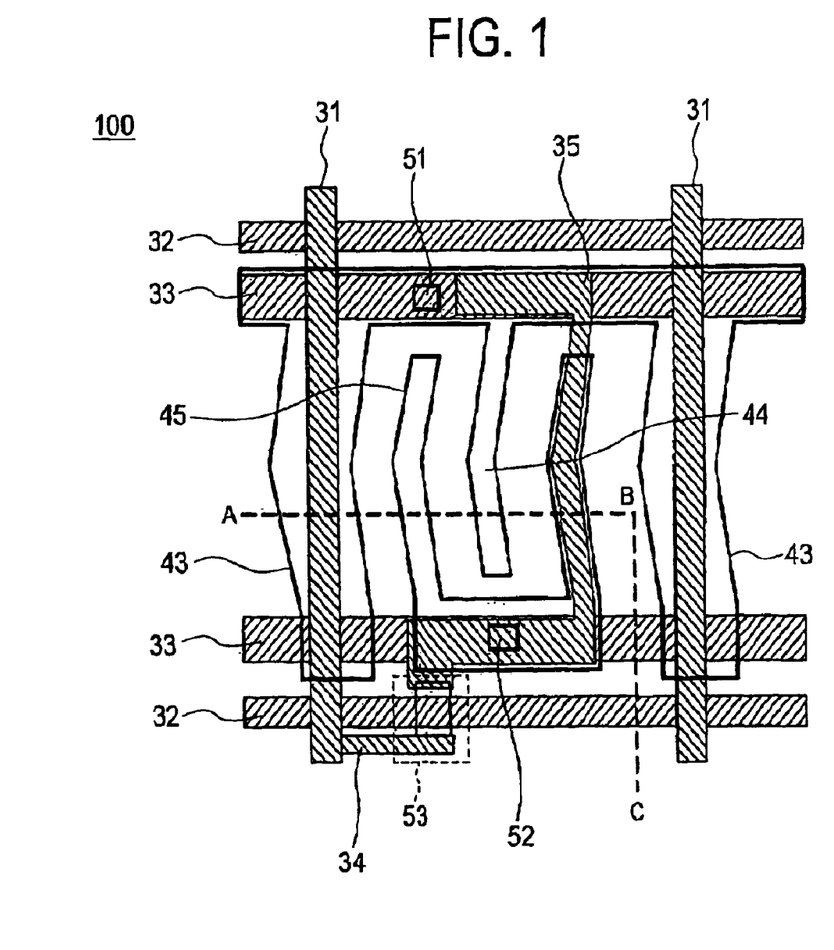
FIG. 1 is a partial top plan view of a LCD device according to a first embodiment of the present invention.

Referring to FIG. 1, a LCD device, generally designated by numeral 100, according to a first embodiment of the present invention is implemented as an IPS LCD device, wherein the LC layer sandwiched between a pair of LCD panels is applied with a lateral electric field. The LCD device 100 includes a plurality of pixels arranged in an array, a plurality of signal lines 31 extending in the column direction of the array, a plurality of scanning lines 32 extending in the row direction of the array, and a plurality of common electrode lines 33 extending parallel to the scanning lines 32.

Each pixel has a pixel area defined by adjacent two of the signal lines 31 and adjacent two of the scanning lines 32. Each pixel includes a drain electrode line 34 extending from a corresponding one of the signal lines 31, a thin-film transistor (TFT) 53 having a drain connected to the drain electrode line 34 and a gate connected to the corresponding scanning line 32, a pixel electrode 35 connected to the source of the TFT 53, a common electrode 44 connected to the common electrode lines 33, and a shielding common electrode 43. The signal lines 31, scanning lines 32 and common electrode lines 33 are optically shielded by a black matrix (not shown) against the observer.

The TFT 53 connects/disconnects the pixel electrode 35 to/from the corresponding signal line 31 via the drain electrode line 34 depending on the presence or absence of the voltage applied to the corresponding scanning line 32. The layer of the pixel electrode line 35 is different from the layer of the common electrode line 33. The pixel electrode line 35 has a pair of branch portions overlapping the adjacent common electrode lines 33 with an intervention of an insulator film, and a bridge portion extending in the pixel area for bridging together the branch portions. Each branch portion and the corresponding portion of the corresponding common electrode line 33 form a storage capacitor.

Each of the shielding common electrode 43, common electrode 44 and pixel electrode 45 is made of a transparent conductive material, such as indium oxide tin (ITO), and has a slight bend at the central portion thereof. The voltage applied to the pixel electrode 45 generates a multi-domain electric field in the LC layer. The shielding common electrode 43 and the common electrode 44 are connected together to the underlying common electrode line 33 via a contact plug 51, whereas the pixel electrode 45 is connected to the pixel electrode line 35 via a contact plug 52.

Figure 2:
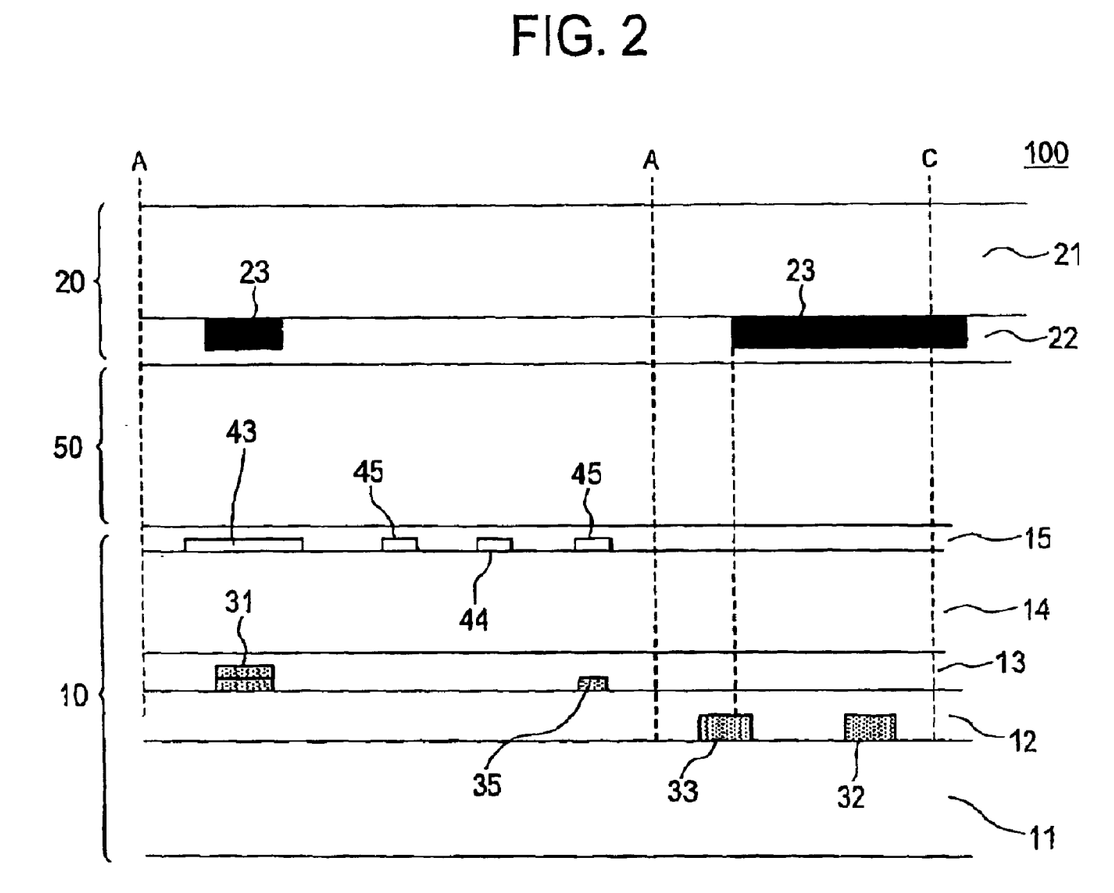
FIG. 2 is a sectional view taken along line A-B-C in FIG. 1.

Referring to FIG. 2, there is shown a sectional view of the LCD device 100 of FIG. 1 taken along line A-B-C. The LCD device 100 includes a TFT panel 10 on which TFTs and signal lines etc. are formed, a counter panel 20 on which the black matrix 23 is formed, and the LC layer 50 sandwiched between the TFT panel 10 and the counter panel 20. The TFT panel 10 includes a first glass substrate 11, a first inorganic insulator film (gate insulator film) 12, a second inorganic insulator film (protective film) 13, an organic insulator film 14, and an orientation film 15. The counter panel 20 includes a second glass substrate 21, the black matrix 23 and a protective film 22. The backlight source (not shown) is disposed at the rear side of the TFT panel 10.

The first glass substrate 11 mounts thereon a polarization plate (not shown) for limiting the light components travelling from the backlight source toward the counter panel 20. An optical sheet assembly (not shown) is disposed between the backlight source and the first glass substrate 11 for enhancing the light condensing capability. The optical sheet assembly has a function for reducing the light components obliquely incident onto the glass substrate and increasing the light components incident onto the first glass substrate 11 perpendicularly thereto. Examples of the optical sheet assembly include prism sheet and scattering sheet, and one or more of these sheets of same type or different types are used as a single sheet or stacked sheets.

Figure 3:
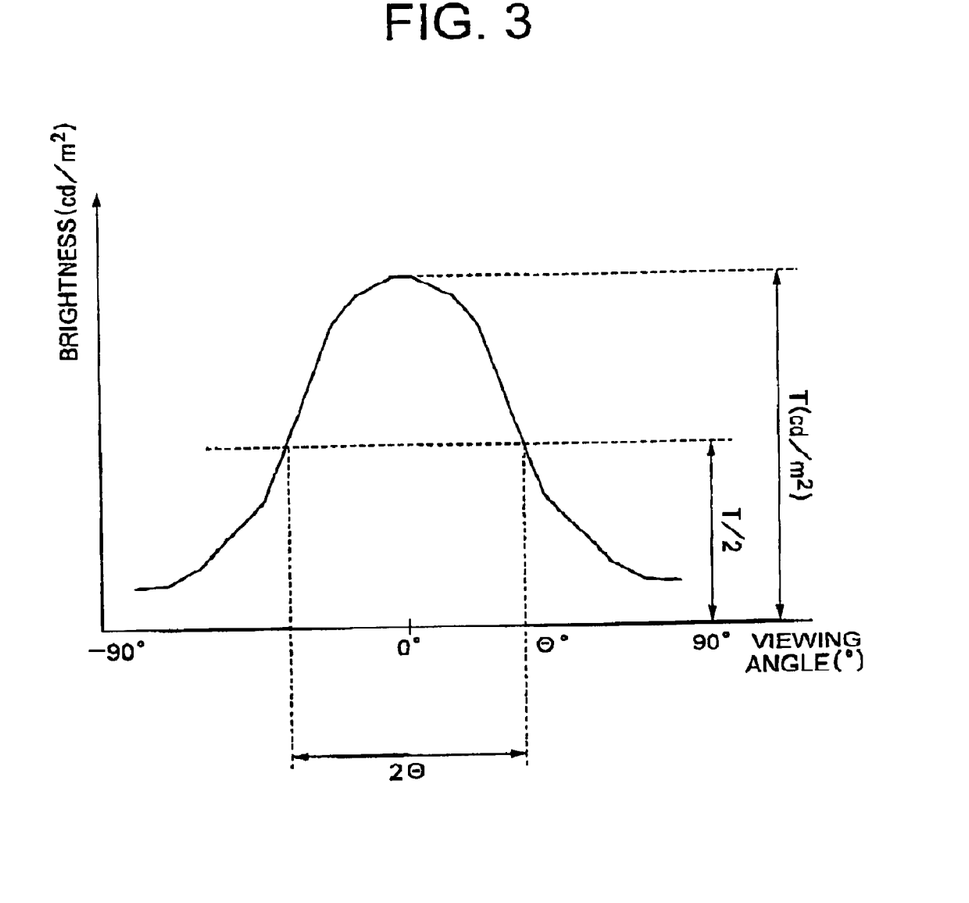
FIG. 3 is graph showing the relationship between the viewing angle and the brightness of backlight.

Referring to FIG. 3, there is shown the relationship between the viewing angle and the brightness on the screen after passing the polarization plate disposed on the TFT side, wherein stacked optical sheets are disposed between the backlight source and the first glass substrate 11. The viewing angle is measured with respect to the perpendicular line of the front surface of the backlight source, the perpendicular line corresponding to a viewing angle of zero degree. The brightness on the screen is measured along the horizontal direction, vertical direction and oblique directions at angles of ±45 degrees passing through the central point of the front surface of the backlight source, while changing the viewing angle. The oblique angles of ±45 degrees correspond to the diagonal lines of the front surface of the backlight source.

In FIG. 3, the half-value width $\Theta$ for the viewing angle with respect to the peak brightness is defined as the viewing angle at which the measured brightness is half the peak brightness (T). A smaller half-value width $\Theta$ for the viewing angle, i.e., a higher condensing capability generally corresponds to a smaller amount of oblique light components which are obliquely incident onto the TFT panel from the backlight source. In the present embodiment, the half-value width $\Theta$ is set at less than 60 degrees, for example, to increase the amount of the perpendicular light components which are incident onto the TFT panel in the perpendicular direction.

Back to FIG. 2, the first glass substrate 11 mounts thereon the scanning line 32 and common electrode line 33, which are isolated from the overlying signal line 31 and pixel electrode line 35 by the first inorganic insulator film 12. The thickness of the signal line 31 is larger than the thickness of the pixel electrode line 35. The signal line 31 and pixel electrode line 35 are isolated from the overlying interconnect lines by the second inorganic insulator film 13 and the organic insulator film 14. The signal line 31, scanning line 32 and common electrode line 33 have respective widths and respective thicknesses and are made of respective conductive materials so that these lines 31, 32 and 33 have respective suitable line resistances. The TFT 53 in FIG. 1 has the first inorganic insulator film 12 as the gate insulator film, and is formed at the suitable location overlying the scanning line 32.

The shielding common electrode 43, common electrode 44 and pixel electrode 45 are disposed on the organic insulator film 14 so that the LC layer 50 sandwiched between the TFT panel 10 and the counter panel 20 is applied with a lateral electric field which is parallel to the TFT and counter panels 10 and 20. The orientation film 15 is formed on the organic insulator film 14 for aligning the axes of LC molecules in the LC layer 50 upon absence of the applied voltage.

The second glass substrate 21 mounts the polarization plate (not shown) on the outer surface thereof. The polarization plate on the second glass plate 21 has a polarization axis perpendicular to the polarization axis of the polarization plate mounted on the first glass substrate 11. As a result, the backlight passing through is the first glass substrate 11 cannot pass through the counter panel 20 upon absence of the applied voltage in the LC layer 50, whereby the screen of the LCD displays black. The black matrix 23, formed on the inner surface of the second glass substrate 21, optically shields the signal lines 31, scanning lines 32 and common electrode lines 33 against the observer, thereby separating the LCD device into a plurality of pixel areas.

The signal line 31 and pixel electrode line 35 are formed in the steps as detailed hereinafter. First, a metal or metal alloy (which may be sometimes referred to as collectively "metal"), such as aluminum, aluminum alloy and chrome, is deposited on the entire surface of the first inorganic insulator film 21 to form a first metallic film. The first metallic film is then patterned by a photolithographic etching process using a photoresist mask as an etching mask to form the lower layer of the signal line 31. In this step, the portion of the first metallic film formed on the location of the pixel electrode line 35 is also removed. A second metallic film is then deposited on the entire surface, and patterned to leave the portions of the second metallic film on the lower layer of the signal line 31 and on the location of the scanning line 35. Thus, the signal line 31 has a two-layer structure including the lower layer and the upper layer formed thereon from the second metallic film, whereas the pixel electrode line 35 has a single-layer structure formed by the second metallic film.

In the present embodiment, the signal line 31 has a desired large thickness to obtain a desired low line resistance, whereas the pixel electrode line 35, which resides in the pixel area and is not optically shielded by the black matrix 23, has a smaller thickness to reduce the amount of light reflected from the sides of the pixel electrode line 35 in the pixel area. It is to be noted that the pixel electrode line 35 may have a moderate line resistance, i.e., may have a higher line resistance than the signal line 31.

In addition, the second metallic layer may be made of chrome having a lower surface reflectance and a higher specific resistance than aluminum, with the first metallic layer being aluminum (or aluminum alloy). This further reduces the amount of light reflected by the side surfaces of the pixel electrode line 35.

In the conventional LCD device, the pixel electrode line 35 and the signal line 31 are formed by a single photolithographic and etching step using a common metallic film, and thus have the same thickness. Thus, in the conventional LCD device, the lower line resistance of the signal line 31 and the lower amount of reflected light from the pixel electrode line 35 are trade-off. More specifically, aluminum or aluminum alloy reduces the line resistance of the signal line 31 and yet increases the amount of reflected light from the pixel electrode line 35, whereas chrome reduces the amount of reflected light from the pixel electrode line 35 and yet increases the line resistance of the signal line 31. On the other hand, the lower line resistance and the smaller amount of reflected light can be compatible in the present embodiment by during the two-film structure of the signal line 31 and the single-film structure of the pixel electrode line 35.

In general, the intensity of scattered light is in proportion to $R \times d \times L$ where R, d and L are the surface reflectance, thickness and total length of the metallic interconnect line formed in the area through which the light passes. For example, aluminum has a surface reflectance of 0.8 to 0.9, whereas chrome has a surface reflectance of 0.6 to 0.7. Thus, by reducing the thickness of the pixel electrode line 35 down to half that in the conventional LCD device and employing chrome for the material of the pixel electrode line 35, the amount of reflected light can be reduced down to 40% of that in the conventional LCD device.

The use of the stacked optical sheets reduces the amount of oblique light components obliquely incident onto the TFT panel 10, thereby reducing the amount of light scattered by the pixel electrode line 35. Both the suppression of the oblique light components and reduction of the amount of reflected light reduce, upon display of black, the amount of light components changing the polarized state, which pass through the polarization plate of counter-side, due to the reflection and scattering by the pixel electrode line 35. This allows the polarization plate to suitably block the undesirable light components, thereby achieving reduction of the black brightness and thus a higher contrast ratio.

Figure 4:
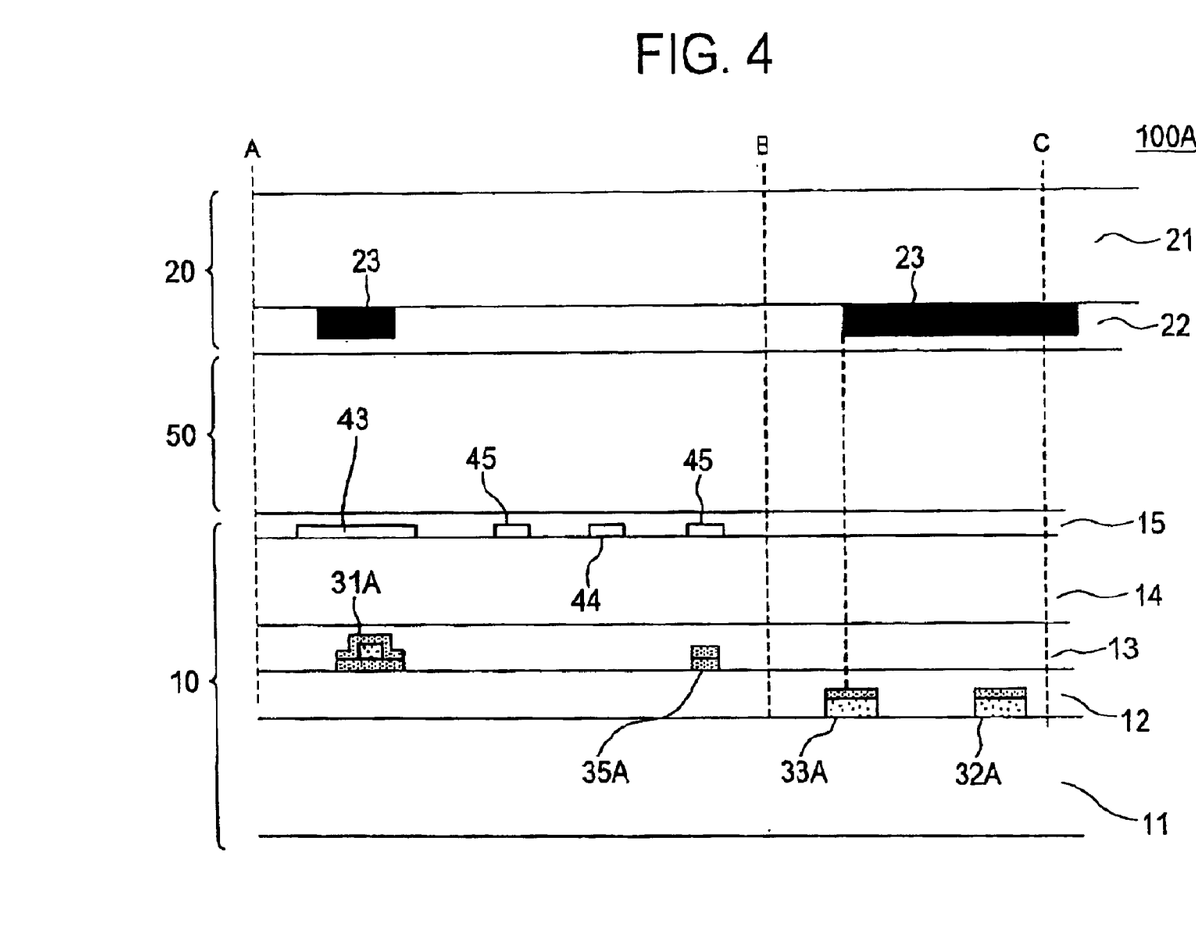
FIG. 4 is a sectional view of a LCD device according to a second embodiment of the present invention.

Referring to FIG. 4, a LCD device, generally designated by numeral 100A, according to a second embodiment of the present invention is similar to the first embodiment except that the scanning line 32A and common electrode line 33A in the present embodiment have a two-layer structure including an aluminum layer and a chrome layer, and that the signal line 31A in the present embodiment has a three-layer structure including a chrome layer, an aluminum layer and another chrome layer, with the edges of the aluminum layer being covered by the edges of the another chrome layer.

It is to be noted that each of the signal line 31A, scanning line 32A and common electrode line 33A extends substantially over the entire area of the LCD device 100A to have a larger length and thus is desired to have a lower line resistance, especially in a large-screen and high-definition LCD device. However, if these lines are made of aluminum for reducing the line resistance, then a larger amount of light components are reflected by the pixel electrode line 35A, which is formed as a common layer with the signal line 31A and extends in the pixel area through which the light passes, thereby increasing the intensity of scattered light and degrading the contrast ratio. In the present embodiment, the above configurations achieve a lower line resistance for the signal line 31A, scanning line 32A and common electrode line 33A and also reduces the intensity of scattered light from the pixel electrode line 35A.

The scanning line 32A and common electrode line 33A are formed in the steps as detailed hereinafter. First, an aluminum layer is deposited on the entire surface of the first glass substrate 11, followed by deposition of a chrome layer. A photoresist film is then formed on the chrome layer by coating, followed by exposure and development thereof to form a photoresist mask. The chrome and aluminum layers are then patterned using the photoresist mask as an etching mask to form the scanning line 32A and common electrode line 33A. The edges of each of the scanning line 32A and common electrode line 33A are flush due to the simultaneous etching step.

The intensity of light scattered by each of scanning lines 32A and common electrode line 33A is the sum of the intensity of scattered light from the aluminum layer and the intensity of scattered light from the chrome layer. Thus, the lower line resistance and the smaller intensity of scattered light are compatible in the present embodiment.

The signal line 31A and pixel electrode line 35A are formed in the steps as detailed hereinafter. First, a chrome layer is deposited on the first organic insulator film, followed patterning thereof to form a chrome line. In this patterning, the portion of the chrome layer on the location of the signal line 31A is formed as a large-width pattern. An aluminum layer is then deposited over the entire surface. Subsequently, a photoresist film is formed on the aluminum layer by coating and patterned to form a photoresist mask, followed by etching the aluminum layer by using the photoresist mask as an etching mask. In this etching, the portion of the aluminum layer on the chrome line of the pixel electrode line is entirely removed therefrom, and the portion of the aluminum layer on the large-width chrome pattern of the signal line is patterned to form a small-width pattern.

After removing the photoresist mask, another chrome layer is deposited on the entire surface, and patterned by a photolithographic etching process to form the another chrome layer on the small-width aluminum of the signal line 31 and on the chrome layer of the pixel electrode line 35A. After the etching, the pixel electrode line 35A has a two-layer structure including two chrome layers, whereas the signal line 31A has a three-layer structure wherein the central aluminum layer is sandwiched between the pair of chrome layers, with the edges of the aluminum layer being entirely covered by the edges of the another chrome layer. Thus, the signal line 31A has a lower line resistance and a lower reflectance, whereas the pixel electrode line 35A has a lower reflectance.

In the present embodiment, each of the signal line 31A, scanning line 32A and common electrode line 33A has a lower line resistance due to the use of aluminum, and has a lower reflectance due to the use of chrome. Especially, the signal line 31A as well as the pixel electrode line 35A has a further lower reflectance to thereby achieve reduction of the black brightness and thus a higher contrast ratio. Thus, the LCD device 100A of the present embodiment is suited to a large-screen and high-resolution LCD device. The thicknesses of the aluminum layer and chrome layer should be designed to obtain a desired line resistance.

Figure 5:
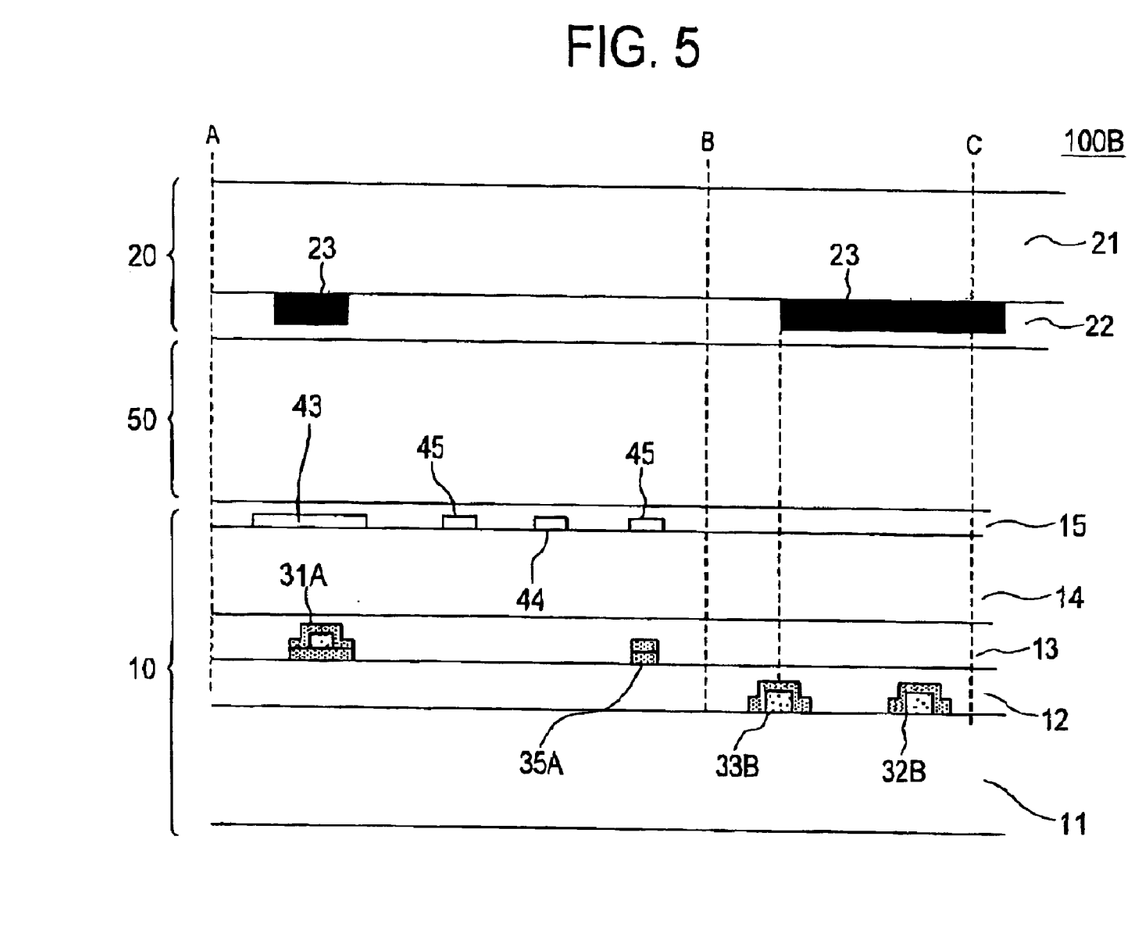
FIG. 5 is a sectional view of a LCD device according to a third embodiment of the present invention.

Referring to FIG. 5, a LCD device, generally designated by numeral 100B, according to a third embodiment of the present invention is similar to the second embodiment except that the edges of aluminum layer in the scanning line 32B and common electrode line 32B in the present embodiment are covered by the edges of the overlying chrome layer.

The scanning line 32B and common electrode line 33B in the present embodiment are formed as detailed hereinafter. An aluminum layer is first deposited on the entire surface of the first glass substrate 11, followed by photolithographic etching thereof using a photoresist mask to form small-width patterns of the scanning line 32B and common electrode line 33B. After removing the photoresist mask, a chrome layer is deposited on the entire surface, followed by etching thereof to form a large-width pattern left on the small-width aluminum pattern. Thus, the edge of the aluminum layer are entirely covered by the edges of the chrome layer, to achieve a lower reflectance of the scanning line 32B and common electrode line 33B while assuring a lower line resistance. The LCD device 100B of the present embodiment further improves the contrast ratio.

Figure 6:
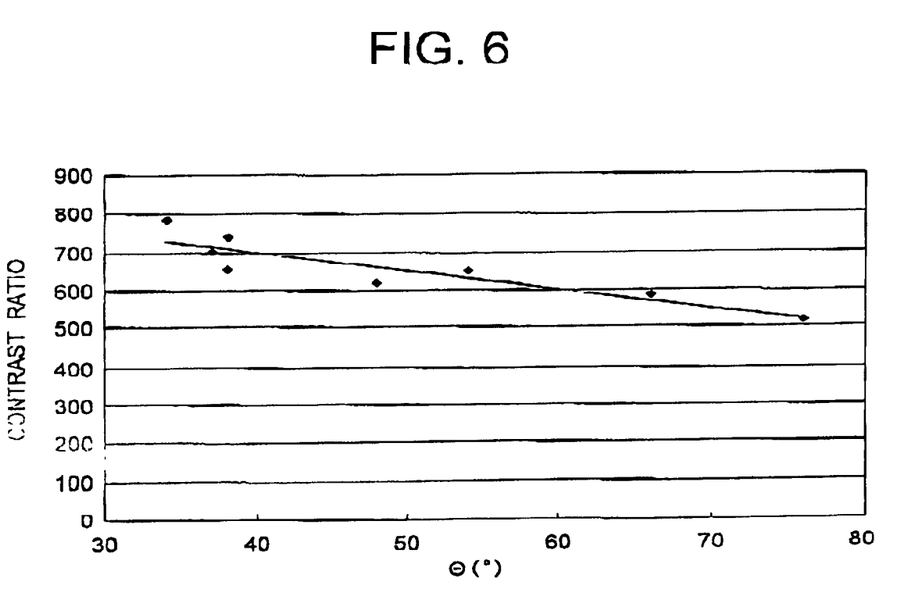
FIG. 6 is a graph showing the relationship between the contrast ratio and the half-value width in the LCD device of the third embodiment.

Referring to FIG. 6, there is shown the relationship between the contrast ratio and the half-value width for the viewing angle with respect to the peak brightness, which clarifies the relationship between the condensing capability and the contrast ratio in the LCD device of the present embodiment. The reduction of the amount of reflected light from the interconnect lines as well as a higher condensing capability of backlight in the present embodiment lowers the half-value width for the viewing angle, which achieves a higher contrast ratio, as understood from FIG. 6. In particular, a half-value width of 60 degrees or less provides a contrast ratio as high as about 600 or above.

Although the aluminum layer is entirely covered by the chrome layer in the signal line 31A in FIG. 4, for example, the signal line 31A need not be necessarily covered by the chrome layer on top of the signal line 31A so long as the edges of the aluminum layer are covered by the chrome layer. The etching of the aluminum layer and chrome layer may be conducted at a time after deposition of these layers, or may be conducted separately by consecutive deposition and etching of each layer. In the latter case, the pixel electrode line has a thickness same as the thickness of the chrome layer.

As described above, by reducing the thickness of the signal line extending in the pixel area through which light passes and/or using a lower-reflectance material for the signal line, the LCD devices of the above embodiment reduce the intensity of scattered light, thereby reducing the black brightness and improving the contrast ratio.

Since the above embodiments are described only for examples, the present invention is not limited to the above embodiments and various modifications or alterations can be easily made therefrom by those skilled in the art without departing from the scope of the present invention. For example, although the LCD devices exemplified in the above embodiments are of a monochrome type, the present invention can be applied to a color LCD device by providing a color filter on the counter panel. In addition, at least a part of the interconnect lines described above may be formed on the counter panel.

What is claimed is:

1. A liquid crystal display (LCD) device comprising:

a liquid crystal layer;

a pair of opposing panels sandwiching therebetween said liquid crystal layer;

a black matrix mounted on either of said opposing panels for defining an array of pixels each having a pixel area in said LCD device; and an interconnect layer mounted on one of said opposing panels and patterned to a plurality of interconnect lines formed on a common insulator, wherein:

one of said interconnect lines extending in said pixel area is lower in a product of a thickness thereof by a surface reflectance thereof than another of said interconnect lines extending outside said pixel area.

2. The LCD device according to claim 1, wherein said one and another of said interconnect lines are made of a metal or alloy, and said one of said interconnect lines has a smaller thickness than said another of said interconnect lines.

3. The LCD device according to claim 1, wherein said another of said interconnect lines includes first and second layers consecutively formed on said common insulator, and said one of said interconnect lines includes a single layer formed as a common layer with said second layer.

4. The LCD device according to claim 1, wherein said one of said interconnect lines has a surface reflectance lower than a surface reflectance of said another of said interconnect lines.

5. The LCD device according to claim 1, wherein said one of said interconnect lines is connected to a storage capacitor associated with one of said pixels.

6. The LCD device according to claim 1, wherein said another of said interconnect lines supplies a signal to said pixels arranged in a column direction of said array.

7. The LCD device according to claim 1, wherein said another of said interconnect lines has three layers respectively including a first metal, a second metal and said first metal, and said one of said interconnect lines has a single layer or two layers including said first metal.

8. The LCD device according to claim 7, wherein said another of said interconnect layers has side surfaces covered with said first metal.

9. The LCD device according to claim 1, wherein said one or the other of said opposing panels mounts thereon another interconnect layer patterned to a plurality of interconnect lines optically shielded by said black matrix, and one of said interconnect lines of said another interconnect layer includes first and second layers having different surface reflectances.

10. The LCD device according to claim 9, wherein said first layer has a lower surface reflectance than said second layer, and covers at least side surfaces of said second layer.

11. The LCD device according to claim 1, wherein said LCD device is a monochrome LCD device and has a contrast ratio of 600 or above.

12. The LCD device according to claim 1, wherein said LCD device is an in-plane switching mode LCD device.

* * * * *